United States Patent [19]

Harashima et al.

[11] Patent Number: 5,537,523
[45] Date of Patent: Jul. 16, 1996

[54] METHOD AND APPARATUS FOR DISPLAYING ALTITUDE OF FORM CHARACTERISTICS GENERATED FROM A GEOMETRIC MODEL IN A COMPUTER USING A GRAPH

[75] Inventors: Ichiro Harashima; Norihiro Nakajima; Hiroshi Arai, all of Hitachi, Japan

[73] Assignee: Hitachi, Ltd., Tokyo, Japan

[21] Appl. No.: 46,569

[22] Filed: Apr. 16, 1993

[30] Foreign Application Priority Data

Apr. 17, 1992 [JP] Japan .................................. 4-097867
Nov. 12, 1992 [JP] Japan .................................. 4-302472

[51] Int. Cl.$^6$ ................................................ G06T 15/00
[52] U.S. Cl. ........................ 395/140; 395/155; 395/159
[58] Field of Search ........................ 395/140, 119–122, 395/125, 127, 133, 135, 141, 152, 153, 154, 155, 157, 158, 159, 160, 161

[56] References Cited

U.S. PATENT DOCUMENTS 3,613,501  10/1971  Sanders ................................. 90/13 R
4,228,430  10/1980  Iwamura et al. ....................... 340/709
4,895,431  1/1990  Tsujiuchi et al. ....................... 350/320
5,333,244  7/1994  Harashima ............................. 395/119

*Primary Examiner*—Almis R. Jankus
*Attorney, Agent, or Firm*—Antonelli, Terry, Stout & Kraus

[57] ABSTRACT

The present invention is to output the geometric form characteristic, such as the principal curvature of a geometric model constituted in a computer to meet an image of a user to easily modify the form. In order to achieve the foregoing object, there is suggested an apparatus for displaying a geometric form characteristic that includes a form display device for displaying, on a display device such as a CRT, a geometric model input in the computer, a position instruction device for indicating, on the display screen, an arbitrary point on the displayed form by using a pointing device such as a mouse, a geometric form characteristic calculating device for calculating the geometric form characteristic at the arbitrarily indicated point, and a geometric form characteristic display device for displaying the calculated geometric form characteristic in the form of a graph. According to the present invention, a form that meets the image of a user, such as a concave, convex and the plane portion can be displayed as the user directly touches the form using a mouse.

19 Claims, 9 Drawing Sheets

METHOD AND APPARATUS FOR DISPLAYING ALTITUDE OF FORM CHARACTERISTICS GENERATED FROM A GEOMETRIC MODEL IN A COMPUTER USING A GRAPH

BACKGROUND OF THE INVENTION

The present invention relates to a method and an apparatus for displaying a geometric form characteristic, and more particularly to a method of displaying a form for use in a form designing/machining analyzing/visualizing system incorporating a computer, for example, mechanical CAD (Computer Aided Design)/CAM (Computer Aided Manufacturing)/CAE (Computer Aided Engineering), and CG (Computer Graphics).

When the form of an industrial product or the like is designed by using a form design aiding system such as a mechanical CAD, the form is usually expressed by using a geometric model in the computer. However, the geometric model designed in the computer does not necessarily meet the form imagined by the user. The reasons for this are that the form expressing method in the computer is based on the geometric model and, accordingly, the form expressing command function of the computer is unsatisfactory to express the form imagined by the user, and in particular, to express a free form surface as a geometric model and that performance is insufficient to display the three-dimensional geometric model constituted in the computer on a display device such as a CRT (Cathode Ray Tube).

As a means for overcoming the foregoing problems, it might be considered feasible to employ a method for actually making a model by a model making machine adapted to NC (Numerical Control) cutting work or a method for making a resin model by a perspective resin model making system which uses photosetting resin. In any case, a machining operation must be performed and the model cannot be made in real time. Therefore, the form cannot be modified while establishing a dialogue with the computer.

Another method can be employed capable of displaying a geometric model, designed in a computer, on a display device such as a CRT in a short time, while eliminating the necessity of machining the geometric model. A major portion of the foregoing methods is arranged to perform an optical simulation by using a computer to simulate how a three-dimensional form may appear under a certain light source.

Since the internal portion of a free form surface is expressed by a functional equation, a method may be employed in which a problem of a geometric model designed in a computer is found out by adding a geometric form characteristic, such as the distribution of a normal vector, a curvature vector, a Gaussian curvature, and the mean curvature to the form, followed by displaying them. For example, Japanese Patent Laid-Open No. 62-271067 titled "FREE FORM SURFACE EXPRESSING METHOD" discloses a method of displaying a normal vector at a boundary line between patches to check smoothness connected between a plurality of patches that constitute the free form surface. However, any of the foregoing method simply confirms whether or not the geometric form characteristics are distributed continuously, resulting in a form considerably different from that imagined by a user. Therefore, it is difficult to quickly modify the form by making use of the result of the display.

In Japanese Patent Laid-Open No. 3-278182 titled "METHOD AND APPARATUS FOR SENSITIVELY NOTIFYING FORM", the foregoing problem experienced with a geometric form characteristic expressed by three-dimensional vector such as a normal vector or a curvature vector has been partially overcome in terms of the machine interface by instructing a point on the form displayed on the screen by using a pointing device such as a mouse. However, the geometric form characteristic has not been displayed with which the user is able to easily understand the form.

SUMMARY OF THE INVENTION

An object of the present invention to easily compare the geometric form characteristic of a free form surface input in a computer and an image of a form input by a user to reduce the work required to complete modification of the form by means of a dialogue with the computer. The geometric form characteristic to be dealt with in the present invention includes multi-dimensional tensor quantities such as scalar quantities as well as three-dimensional vectors.

In order to achieve the foregoing object, according to the present invention, there is provided a method of expressing a geometric form characteristic comprising the steps of: inputting geometric data of a geometric model; displaying the geometric model on a display screen; indicating an arbitrary point of the displayed form; converting coordinates indicated on the display screen into coordinates of a point on the designed geometric model; calculating the geometric form characteristic at the indicated point on the geometric model; and displaying the calculated geometric form characteristic on the display screen as a graph expressing quantities.

In order to achieve the foregoing object, according to the present invention, there is provided a method of expressing a geometric form characteristic comprising the steps of: inputting geometric data of a geometric model; displaying the geometric model on a display screen; indicating an arbitrary point of the displayed form; converting coordinates indicated on the display screen into coordinates of a point on the designed geometric model; calculating the geometric form characteristic at the indicated point on the geometric model; and sequentially plotting and displaying in a time-sequential manner a plurality of the calculated geometric form characteristic on a graph on the display screen.

In any case, a plurality of geometric form characteristics are sequentially plotted on the graph on the display screen to be time-sequentially displayed.

Specifically, the graph may be any one of a bar graph for showing a one-dimensional data, a circle graph for showing cyclic one-dimensional data, a three-dimensional arrow graph for showing a direction in a three or lower dimensional space, a two-dimensional graph, the axis of ordinate and the axis of abscissa which respectively are the maximum value and the minimum value of the principal curvature of a curved surface at the indicated point. In this case, it is preferable that the two-dimensional graph is a graph showing a two-dimensional region, the axis of ordinate and the axis of abscissa of which, or the axis of abscissa and the axis of ordinate of which respectively are the maximum value and the minimum value of the principal curvature of a curved surface at the indicated point, which is sectioned in accordance with the form characteristics such as a concave, convex and a plane portion as a background thereof. It is also preferable that the foregoing graph is a graph showing a two-dimensional region, the axis of ordinate and the axis of abscissa of which, or the axis of abscissa and the axis of ordinate of which respectively are the maximum value and the minimum value of the principal curvature of a curved surface at the indicated point, which is sectioned in accordance with the form characteristics such as a concave, convex and a plane portion as a background thereof, the graph also displaying character information expressing the form characteristic at the indicated point.

The graph may be formed by synthesizing at least any one of a bar graph, a circle graph and a three-dimensional arrow graph, and a graph showing a two-dimensional region, the axis of ordinate and the axis of abscissa of which, or the axis of abscissa and the axis of ordinate of which respectively are the maximum value and the minimum value of the principal curvature of a curved surface at the indicated point, or a graph showing a two-dimensional region, the axis of ordinate and the axis of abscissa of which, or the axis of abscissa and the axis of ordinate of which respectively are the maximum value and the minimum value of the principal curvature of a curved surface at the indicated point, which is sectioned in accordance with the form characteristics such as a concave, convex and a plane portion as a background thereof and as well as showing characteristic information indicating the form characteristic at the indicated point.

In order to achieve the foregoing object, according to the present invention, there is provided an apparatus for displaying a geometric form characteristic comprising: means for storing geometric data of an input geometric model; form display means for displaying the geometric model on a display screen; a pointing device for indicating an arbitrary point of the displayed form; position instruction means for converting coordinates instructed on the display screen into the coordinates of the point on the input geometric model; geometric form characteristic calculating means for calculating the geometric form characteristic at the indicated point on the geometric model; and geometric form characteristic display means for displaying the calculated geometric form characteristic on the display screen as a graph.

In order to achieve the foregoing object, according to the present invention, there is provided an apparatus for displaying a geometric form characteristic comprising: means for storing geometric data of an input geometric model; form display means for displaying the geometric model on a display screen; node calculating means for generating nodes on the surface of the geometric model to store the nodes as node data; geometric form characteristic calculating means for previously calculating a geometric form characteristic at each of the nodes in accordance with the geometric data to store the geometric form characteristic as data of the geometric form characteristic; a pointing device for indicating an arbitrary point of the displayed form; position instruction means for calculating the distance from each node to a point that can be obtained by converting the coordinates of the indicated point into the coordinates in a display space to obtain a node nearest the instructed point; geometric form characteristic reading means for reading the geometric form characteristic corresponding to the obtained node from the data of the geometric form characteristic which has been previously stored; and geometric form characteristic display means for displaying the read altitude of form characteristic on a display screen as a graph.

Any apparatus for displaying the geometric form characteristics may include a geometric form characteristic display means for sequentially plotting a plurality of geometric form characteristics on a graph on the display screen to time-sequentially display them.

According to the present invention, the form display means shading-displays the geometric model input in the computer on a display device such as a CRT. The user uses a pointing device such as a mouse to indicate an arbitrary point of the display form with a mouse cursor. The position of the mouse cursor is input into the computer as the coordinates on the display screen. The position instruction means converts the coordinates of the mouse cursor on the display screen into the coordinates of the point on the geometric model designed in the computer. The geometric form characteristic calculating means calculates the geometric form characteristic at the indicated point on the geometric model. The geometric form characteristic display means displays the calculated altitude of the form characteristic on the display screen.

When the geometric form characteristic is displayed, a one-dimensional graph such as a bar graph is used if the geometric form characteristic is a one-dimensional quantity. If it is a two-dimensional quantity, a two-dimensional graph such as an x-y graph is used. More specifically, maximum value $k_{max}$ and minimum value $k_{min}$ (principal curvature) at an arbitrarily indicated point on a curved surface are used as the geometric form characteristic, followed by plotting the geometric form characteristic on a graph, in which the foregoing two parameters are made to be the axis of ordinates and the axis of abscissa, that is, on a principal curvature graph.

The geometric form characteristic to be dealt with in the present invention may include multi-dimensional tensor quantities such as scalar quantities as well as three dimensional vectors.

If the time taken from a moment the user instructs an arbitrary point on the displayed form with the mouse cursor to a moment, at which the display of the geometric form characteristics at the indicated point is performed, is sufficiently short, the user is able to recognize the form designed in the computer as if the user touches the form by using the mouse.

The geometric form characteristic display means is arranged in such a manner that, for example, the background color of the principal curvature graph is changed and the area is divided in accordance with the form characteristics such as the concave, the convex and the plane portion classified in accordance with the numeral or the size of $k_{max}$ and $k_{min}$ of the principal curvature. Therefore, the form characteristic to which the plotted point belongs, that is, the form characteristic of the portion indicated with the mouse cursor can instantaneously be conformed.

The geometric form characteristic display means thus constituted enables the user to easily produce an image having the form characteristic such as the concave, the convex and the plane from the geometric form characteristic such as the principal curvature of a free form surface constituted in the computer. Therefore, the user is able to easily, quickly and accurately recognize or modify the form by utilizing the displayed result.

BRIEF DESCRIPTION OF THE DRAWINGS

Preferred embodiments of the present invention will be described more in detail with reference to the following drawings.

DETAILED DESCRIPTION OF THE PREFERRED EMBODIMENTS

Figure 1:
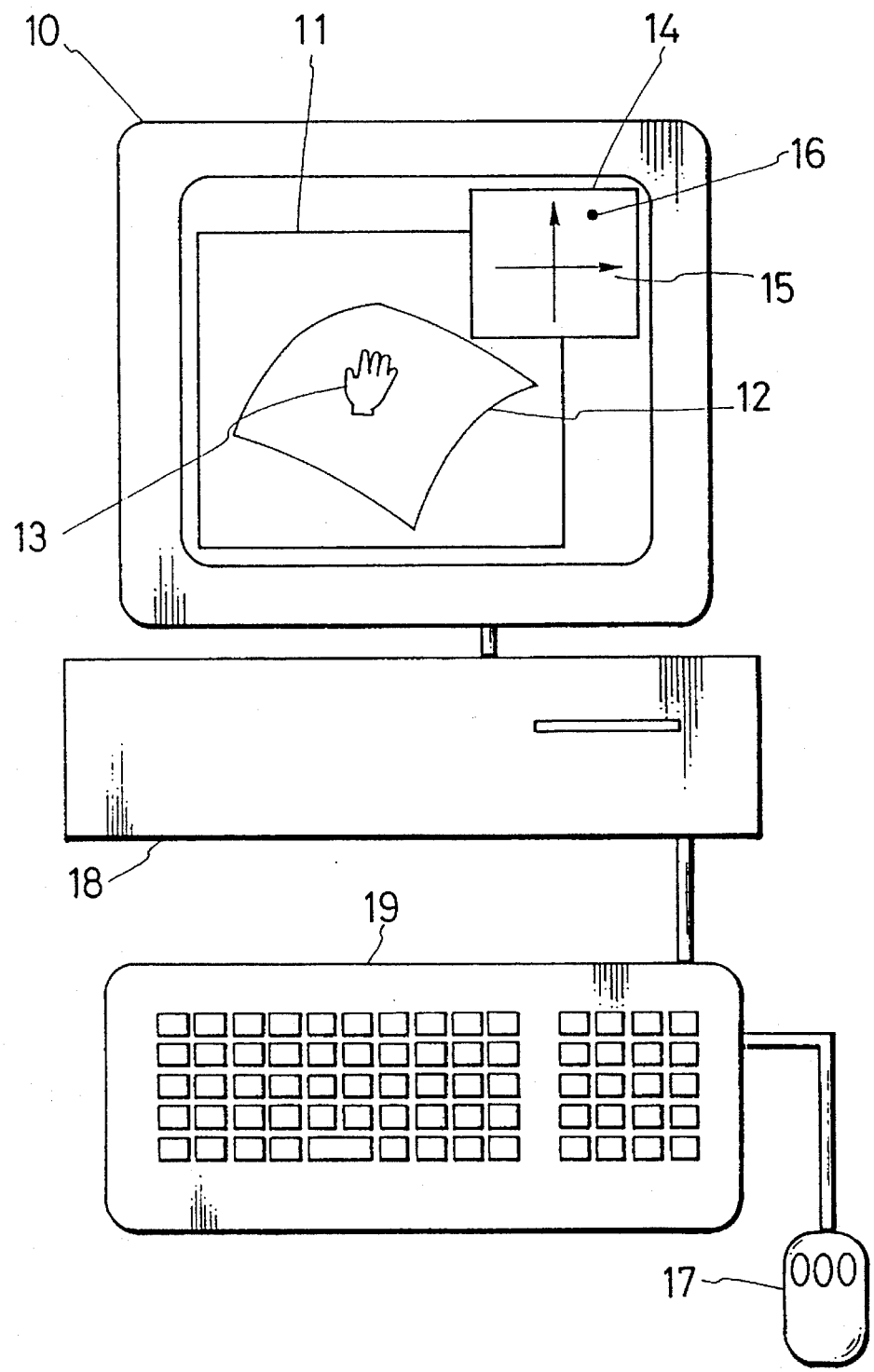
FIG. 1 illustrates an example of the structure of an apparatus and an example of a display on a screen according to an embodiment of the present invention.
Figure 2:
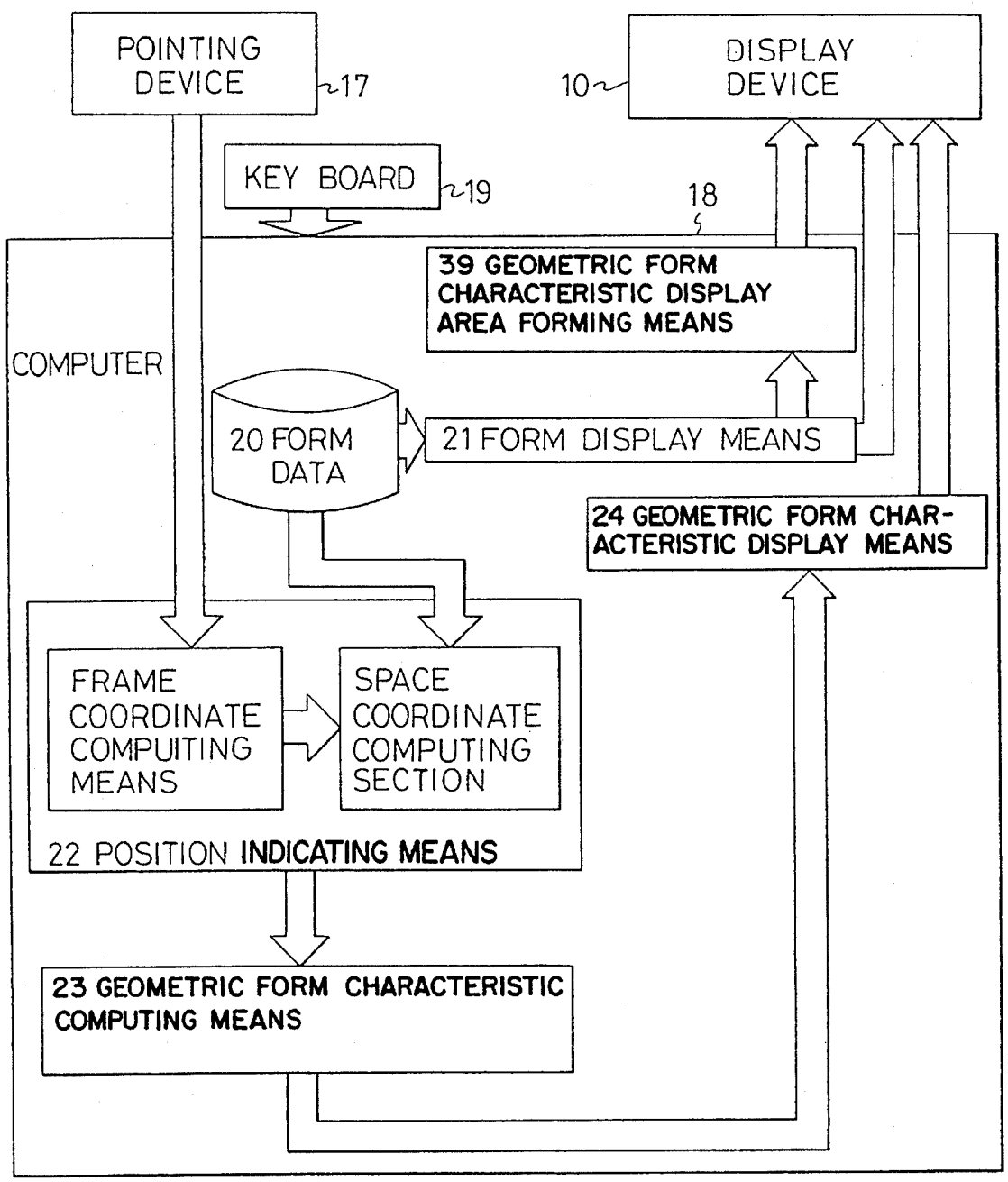
FIG. 2 is a block diagram which illustrates the apparatus shown in FIG. 1 in detail.

FIG. 1 illustrates the structure of a system according to an embodiment of the present invention and an example of a displayed image. FIG. 2 is a block diagram which illustrates the structure of a computer employed in the embodiment shown in FIG. 1. The embodiment shown in FIG. 1 includes a computer 18, a display device 10, such as a CRT, connected to the computer 18, a keyboard 19 similarly connected to the computer 18, and a mouse 17 belonging to the keyboard 19 and serving as a pointing device. The computer 18 is, as shown in FIG. 2, includes a position indicating means 22 to be connected to the pointing device 17, a geometric form characteristic calculating means 23 connected to the position instruction means 22, a geometric form characteristic display means 24 connected to the geometric of form characteristic calculating means 23, a geometric data file 20 connected to the position indicating means 22 to store data of the form, and a shape display means 21 connected to the geometric data file 20. The position indicating means 22 includes a drawing coordinate calculating portion connected to the pointing device, and a space-coordinate calculating portion connected to both the drawing-coordinate calculating portion and the foregoing geometric data file 20. The geometric form characteristic calculating means 23 and the form display means 21 are connected to the foregoing display device 10.

The screen of the display device 10 displays a form display region 11 and a geometric form characteristic display region 14 which is the characteristic of the present invention. In the form display region 11, a displayed form 12 and a mouse cursor 13 for indicating an arbitrary point of the form 12 to correspond to the movement of the mouse 17 are displayed in such a manner that they are superimposed. In the geometric form characteristic display region 14, a graph 15 of a two-dimensional quantity is displayed in this case. In the graph 15, a point 16 is plotted at a parameter position indicating the characteristic of the position of the displayed form 12, the position being instructed by the mouse cursor 13.

The flow of the process to be performed according to this embodiment is as follows: (1) The form display means 21 generates display data for performing shading-display from the form data stored in the geometric data file 20 to be displayed on the display device 10, such as a CRT. The display screen of the display device 10 shown in FIG. 1 shows an example of a displayed image. As another effective example, a form display method based on a stereoscope vision may be employed. (2) A user uses the mouse 17 to move the mouse cursor 13 on the displayed form 12 via the position indicating means 22 so as to indicate a portion on the displayed form 12 that is required. The screen coordinate calculating portion of the position indicating means 22 calculates coordinates A (x,y) on the screen plane of the display device 10 in response to an input signal supplied through the mouse cursor 13. The space coordinate calculating portion calculates coordinates B of the mouse cursor 13 on a three-dimensional geometric model input in the computer from the coordinates A (x,y) on the screen plane of the display device 10. If the three-dimensional geometric model is a free form surface expressed by parameter (u,v) for example, the coordinates are converted from a space (x,y) to a space (u,v). As the conversion method, a method may be employed which obtains an intersection between a straight line and the geometric model, the straight line having the directional vector which is the same as the normal vector of the screen plane and which also passes through a point on the screen plane instructed by using the mouse cursor 13. (3) The geometric form characteristic calculating means 23 calculates the geometric form characteristic from the geometric data and a parameter indicating point B (the position of a point instructed by using the mouse cursor) on the geometric model obtained by the position indicating means 22. (4) The geometric form characteristic display means 24 plots and displays, on the graph 15 of the geometric form characteristic display region 14 on the screen of the display device 10, the geometric form characteristic calculated by the geometric form characteristic calculating means 23, the geometric form characteristic being displayed as a point 16. (5) The processes (2) to (4) are repeated. The point 16 plotted in the process (4) may be plotted after the display of the point on the graph 15 has been deleted, or it may be plotted after the point plotted several times before. In the latter method, the locus of the point is displayed as an afterimage.

Figure 3:
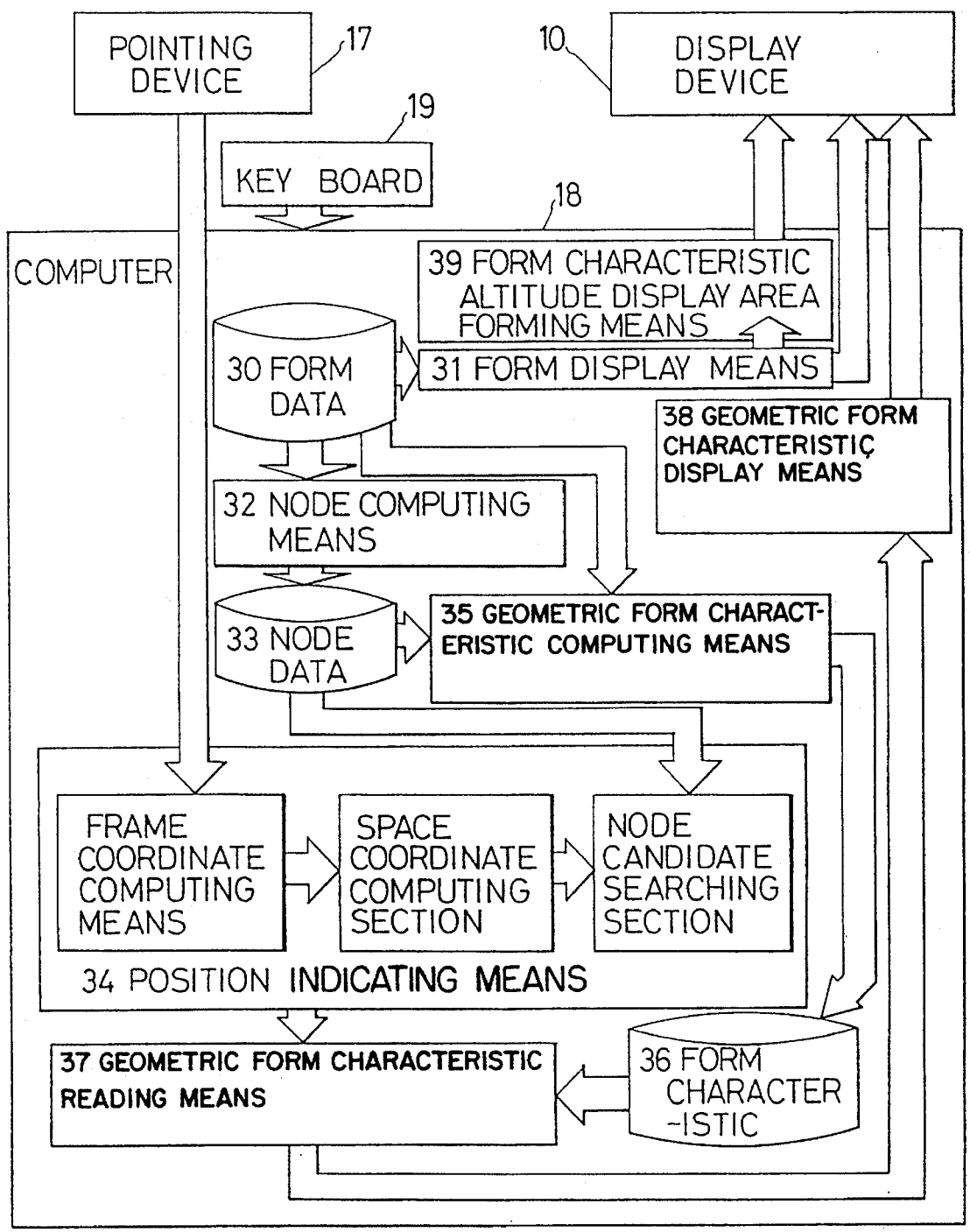
FIG. 3 is a block diagram which illustrates another example of the apparatus shown in FIG. 2.

FIG. 3 is a block diagram which illustrates the structure of the computer 18 according to another embodiment of the present invention, this embodiment revealing higher processing speed as compared with the embodiment shown in FIG. 2. The computer shown in FIG. 3 includes a position indicating means 34 to be connected to a pointing device, a node data file 33 connected to the position instruction means 34 and storing node data, a node calculating means 32 connected to the node data file 33, a geometric data file 30 connected to the node calculating means 32 and storing geometric data, a form display means 31 connected to the data file 30, a geometric form characteristic display region processing means 39 connected to the form display means 31, a geometric form characteristic calculating means 35 connected to both the geometric data file 30 and the node data file 33, a geometric form characteristic data file 36 connected to the geometric form characteristic calculating means 35 to store the geometric form characteristic, a geometric form characteristic reading means 37 connected to both the position indicating means 34 and the geometric form characteristic data file 36, and a geometric form characteristic display means 38 connected to the geometric form characteristic reading means 37.

The form display means 31, the geometric form characteristic display region processing means 39 and the geometric form characteristic display means 38 are connected to the display device 10. The position indicating means 34 includes a screen coordinate calculating portion to be connected to the pointing device, a space-coordinate calculating portion connected to the screen-coordinate calculating portion, and a node candidate searching portion connected to the space-coordinate calculating portion. The node candidate searching portion is connected to the node data file 33.

The flow of processing the geometric form characteristic takes place as follows. (1) The shape display means 31 processes display data for the shading display from the geometric data stored in the geometric data file 30 to display the data on the display device 10, such as a CRT. Also, the form display method is based on the stereoscope vision. The geometric form characteristic display region processing means 39 displays the layout shown in a graph (a principal curvature graph) for displaying the geometric form characteristic shown in FIG. 7. (2) The node calculating means 32 generates dots on the form surface at equal intervals or at the same parameter intervals from the geometric data stored in the geometric data file 30 to store the data in the node data file 33 as node data. If the form mode is a free form surface expressed by parameter (u,v) for example, a table, in which parameters (u,v) and coordinates (x,y,z) correspond one-to-one, is made to be stored as the node data in the node data file 33. (3) The user uses the mouse 17 to move the mouse cursor 13 on the displayed form 12 via the position instruction means 34 to instruct a position on the displayed form 12 that is required for the user to confirm. The procedure for converting coordinates A on the screen indicated by the mouse cursor 13 into coordinates B at a point on the geometric model input in the computer is the same as the method described with reference to FIG. 2. According to this embodiment, the node candidate searching portion chronologically calculates the distance from each point obtained by projecting each node previously calculated by the node calculating means and stored in the node data file 33 onto a plane, which runs parallel to the screen plane in the display space, to the point B obtained by converting the coordinates of the mouse cursor 13 into the coordinate in the display space to calculate the parameter value of the nearest node. (4) The geometric form characteristic calculating means 35 calculates the geometric form characteristic at each node from the geometric data stored in the geometric data file 30 and from the coordinates of each node stored in the node data file 33 to store it as data of the geometric form characteristic in the geometric form characteristic data file 36. (5) The geometric form characteristic reading means 37 reads, from the geometric form characteristic data file 36, the geometric form characteristic corresponding to the node obtained by the position indicating means 34 to output it to the geometric form characteristic display means 38. (6) The geometric form characteristic display means 38 plots and displays the geometric form characteristic supplied from the geometric form characteristic reading means 37 on the graph 15 of the geometric form characteristic display region 14 on the screen of the display device 10, the geometric form characteristic being plotted and displayed as the point 16. (7) The processes (3) to (6) are repeated. The point 16 plotted in the process (6) may be plotted after the display of the point on the graph 15 has been deleted, or it may be plotted after the point plotted several times before has been deleted. In the case shown in FIG. 3, the geometric form characteristic calculating process, which generally takes a long time, is performed previously. As a result, the time taken from a moment the user instructs (operates) an arbitrary point on the displayed form 12 by using the mouse cursor 13 to a moment the geometric form characteristic is displayed via the position indicating means 34, the geometric form characteristic reading means 37 and the geometric form characteristic display means 38 can be shortened satisfactorily. Therefore, the user is able to recognize the geometric model input in the computer as the user touches the surface by using the mouse.

Figure 4:
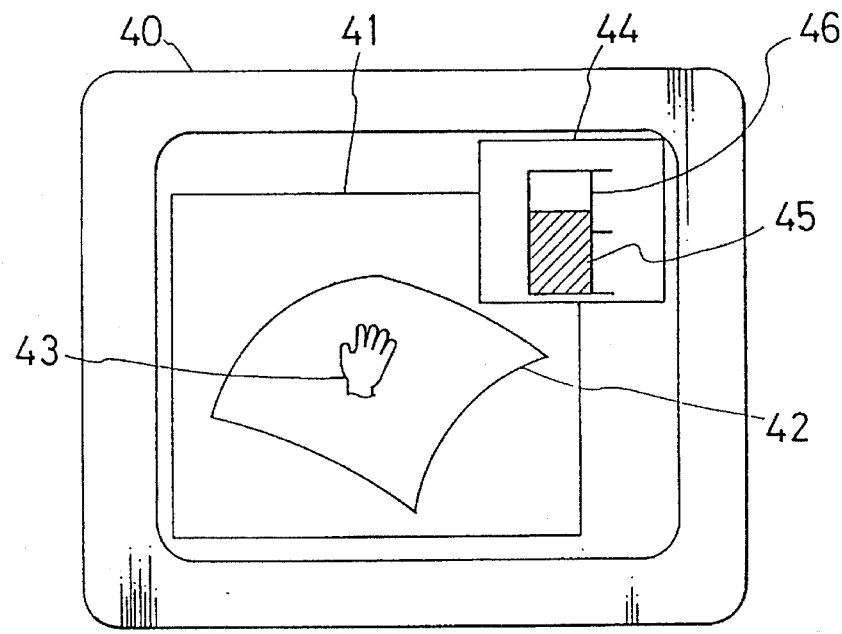
FIG. 4 illustrates an example of a display screen where a geometric form characteristic is displayed in the form of a bar graph.

FIG. 4 illustrates an example of a display screen in the case where a bar graph is employed as the method of displaying the geometric form characteristic in the geometric form characteristic display region 14. If the geometric form characteristic is one-dimensional data such as the distance, the value of the geometric form characteristic is indicated at the position of a bar top portion 46 of a bar graph 45. Assuming that the geometric form characteristic is value z at an arbitrarily indicated point on the displayed form when a view direction of the present display screen is made to be axis Z, the position of the bar top position 46 of the bar graph 45 indicates the height or the depth of the form at the arbitrarily indicated point. As an alternative to the bar graph, the display may be performed by changing the size of the mouse cursor 43. That is, if the height of the form is high (if the depth of the form is shallow) at the arbitrarily indicated point, the mouse cursor 43 is displayed to have a large size. If the height of the form is low (if the depth of the form is deep) at the arbitrarily indicated point, the mouse cursor 43 is displayed to have a small size.

A perspective vision technology based on the parallax is used to perspectively display the form displayed in the shading manner on the display screen and as well as to perspectively display the mouse cursor by a shape of the hand. That is, if the height of the form is high (if the depth of the form is shallow) at the arbitrarily indicated point, the mouse cursor 43 is displayed to have a large parallax so that the mouse cursor 43 is displayed for the user on the screen at a position adjacent to the user in a pseudo-perspective manner. If the height of the form is low (if the depth of the form is deep) at the arbitrarily indicated point, the mouse cursor 43 displayed to have a small parallax so that the mouse cursor 43 is displayed for the user on the screen at a position deep in the screen in the pseudo-perspective manner.

Figure 5:
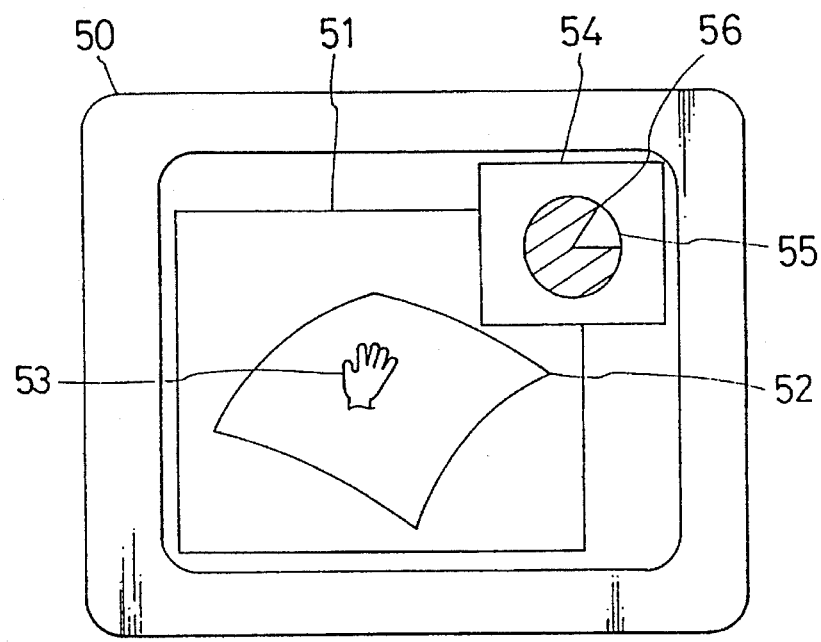
FIG. 5 illustrates an example of a display screen where the geometric form characteristic is displayed in the form of a circle graph.

FIG. 5 illustrates an example when the geometric form characteristic is expressed by a circle graph. If the geometric form characteristic is cyclic one-dimensional data such as angles, a point 56 5 of the circle graph 55 indicates the geometric form characteristic. Assuming that the geometric form characteristic is a projection vector with respect to the normal vector at the arbitrarily indicated point of the displayed from when the projection plane is instructed, the pointer 56 of the circle vector 55 indicates the angle made between the normal vector and the standard vector when the form is viewed from the normal direction of the projection plane.

Figure 6:
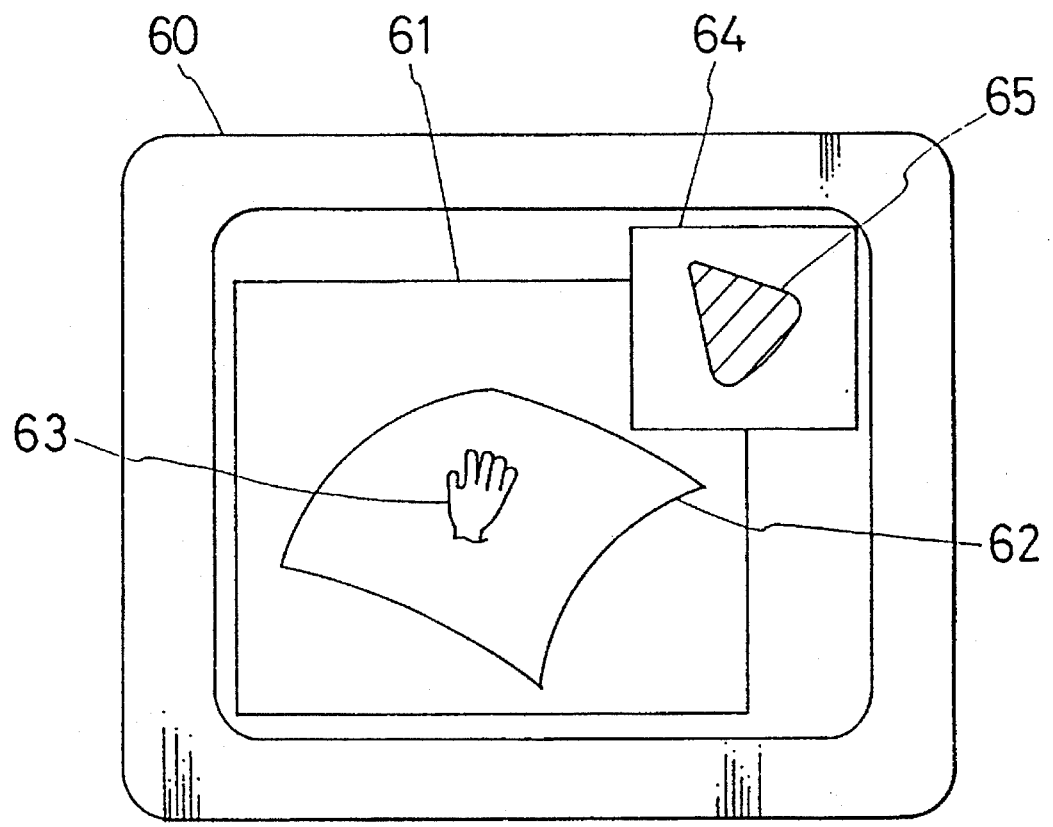
FIG. 6 illustrates an example of a display screen where the geometric form characteristic is displayed in the form of a perspective arrow.

FIG. 6 illustrates an example of a display screen when the geometric form characteristic is displayed with a three-dimensional arrow. The three-dimensional arrow 65 is formed by extending an ordinary arrow for use in a plane figure. In the case shown in FIG. 6, the leading portion of the three-dimensional arrow 65 is formed into a conical shape, the direction of the vertex of the cone indicates the direction of the arrow. Assuming that the geometric form characteristic is the normal vector at an arbitrarily indicated point with the mouse cursor 63 on the displayed form 62, the direction of the three-dimensional arrow 65 indicates the normal vector at the arbitrarily indicated point.

Figure 7:
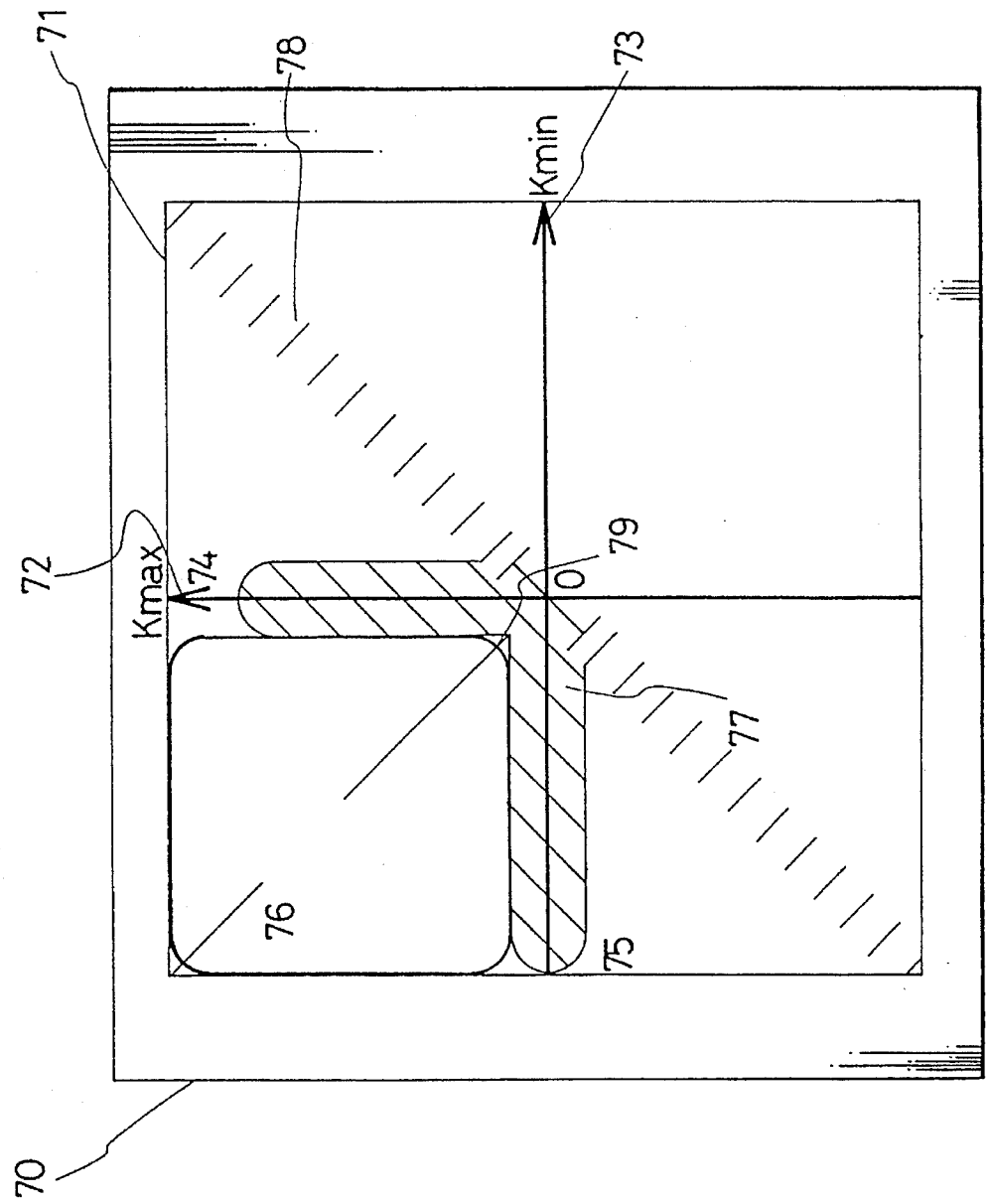
FIG. 7 illustrates an example of a display screen where the geometric form characteristic is displayed in the form of a principal curvature graph.

FIG. 7 illustrates an example of the geometric form characteristic display region in a case where the geometric form characteristic is expressed by a principal curvature graph. A principal curvature graph 71 is a special form of a two-dimensional graph, such as an x-y graph. Reading the maximum value $k_{max}$ at an arbitrarily indicated point on the curved surface along an axis of ordinate 72 and reading the minimum value $k_{min}$ along an axis of abscissa 73, resulted relationship $k_{max} > k_{min}$ causes the upper half of the left portion of the graph to be an effective display region. In a contrary case in which the minimum value $k_{min}$ of the curvature is read along the axis of ordinate 72 and the maximum value $k_{max}$ is read along the axis of abscissa 73, the lower half of the right portion is an effective display region. In either case, there is no difference.

The effective display region can be classified as follows depending upon the form characteristic deduced from the value of $k_{min}$:

(a) $k_{max} > k_{min}$ as well as $k_{max} > -k_{min}$ (concave area 74)

(b) $k_{max} > k_{min}$ as well as $k_{max} < -k_{min}$ (convex area 75)

(c) $k_{max} > 0$ as well as $k_{min} < 0$ (saddle area 76)

(d) $k_{max} = 0\_e1$ or $k_{min} = 0\_e1$ (cylindrical region 77)

(e) $k_{max} = k_{min} + e2$ (umbilicus area 78)

(f) $k_{max} = k_{min} = 0 \pm e3$ (plane area 79)

where e1, e2 and e3 are small quantities that can be arbitrarily instructed by the user, and the umbilicus area is a spherical area and a plane area (which is a range expressed by a diagonal-line portion on a diagonal line including origin portion).

By, for example, changing the background color for the principal curvature graph for each of the foregoing regions, the form characteristic to which the plotted dot belongs, that is, the form characteristic of the portion pointed by the mouse cursor can be immediately confirmed.

Figures 9, 9A, 9B:
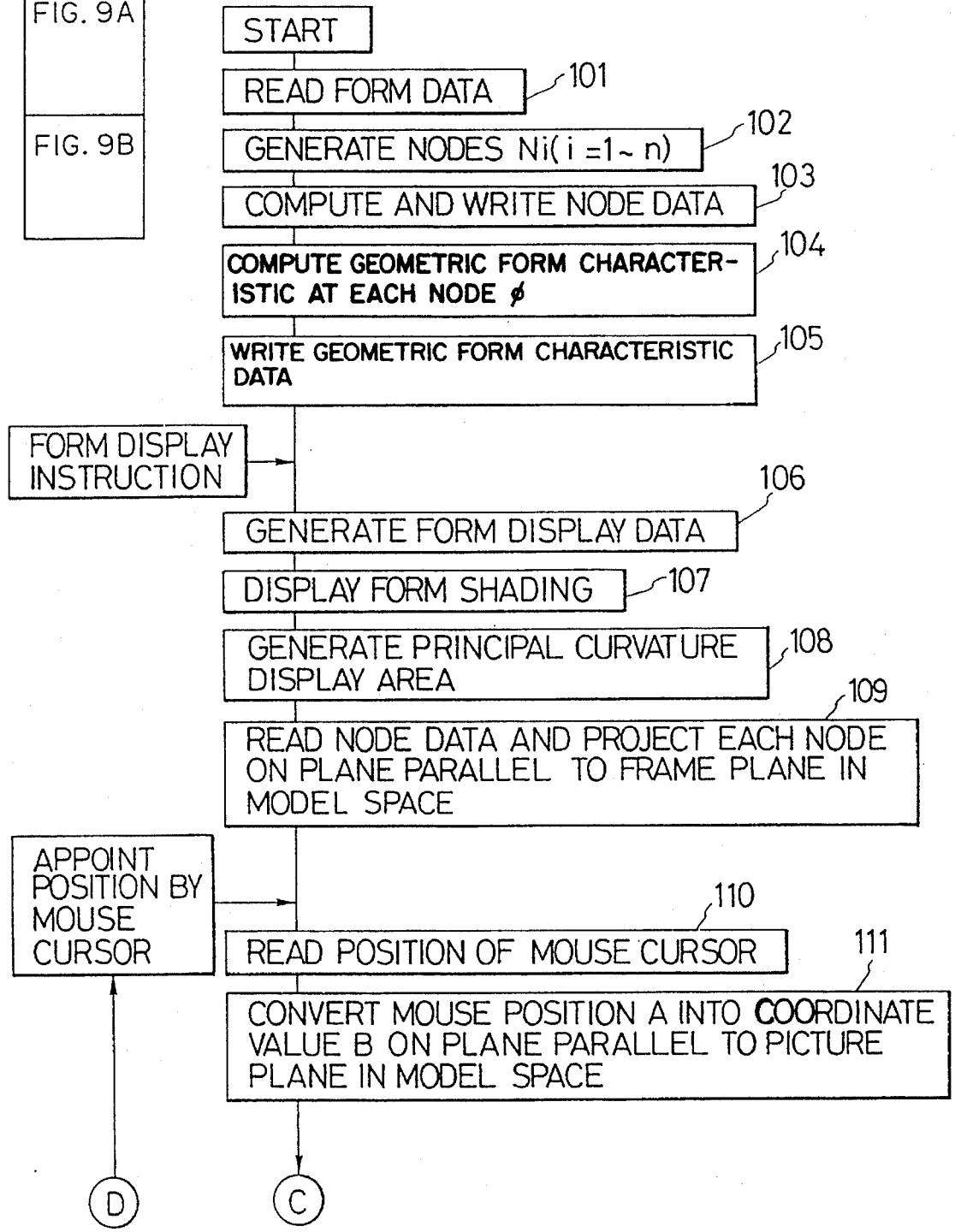
FIGS. 9A to 9B are flow charts of a process when the display on the screen shown in FIG. 8 is performed.
Figure 9B:
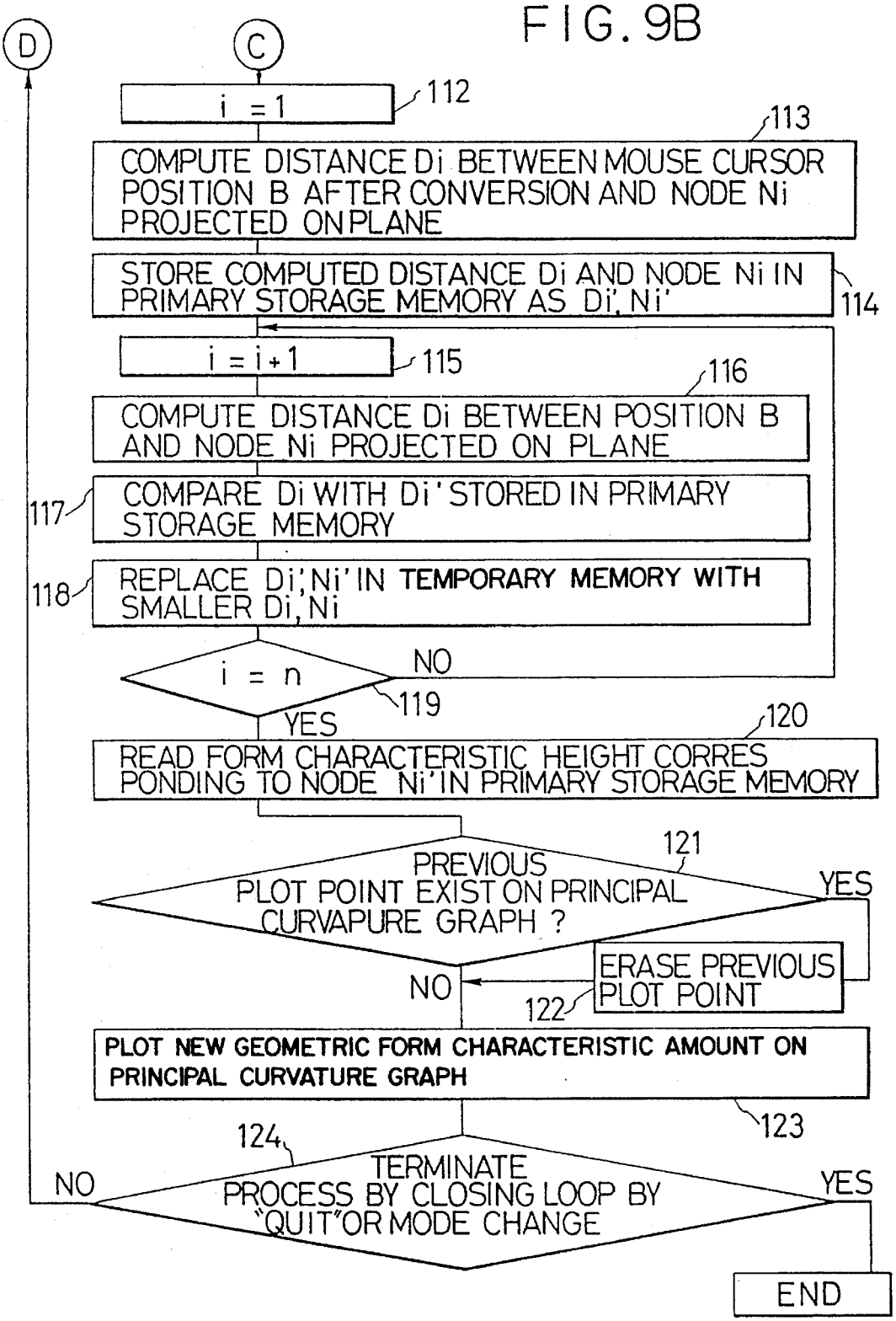

FIGS. 9A and 9B illustrate the procedure of the process performed by the computer 18 when the geometric form characteristic expressing apparatus shown in FIG. 3 is used and the principal curvature graph is used as a graph for expressing the geometric form characteristic of the apparatus.

When geometric data is read into the geometric data file 30 in step 101, the node calculating means 32 generates node Ni (i=1 to n) on the surface of the read form as described above (step 102), followed by processing the table for converting the coordinates on the geometric model into the coordinates of the display screen to write it as node data on the node data file 33 (step 103). When the node data has been written, the geometric form characteristic calculating means 35 uses the geometric data and the node data to calculate the geometric form characteristic ($k_{max}$ and $k_{min}$ of the principal curvature) at each of node positions Ni (i=1 to n) (step 104) to write it to the geometric form characteristic data file 36 (step 105). A so-called preparation stage has been thus completed.

When the user has instructed to display the form on the screen, the form display means 31 reads the geometric data from the geometric data file 30, followed by processing form display data for the shading display (step 106) to display the form display data on the display screen on the display device 10 as the three-dimensional form (step 107). Then, the geometric form characteristic display region processing means 39 outputs display data of the geometric form characteristic display region shown in FIG. 7 to display it on the display screen of the display device 10 in addition to the foregoing form (step 108). When the form and the geometric form characteristic display region have been displayed on the display screen, the node candidate searching portion reads the node data corresponding to the displayed form to project each node on a plane running parallel to the screen plane in the model space (step 109).

When the user has indicated an arbitrary position of the form displayed on the screen by using the mouse 17, the drawing coordinate calculating portion of the position indicating means 34 calculates the coordinates A (x,y) of the position instructed with the mouse cursor on the screen plane of the display device 10 from the signal input with the mouse cursor 13 (step 110). Then, the space coordinate calculating portion calculates the coordinate B of the mouse cursor 13 on the three-dimensional geometric model input in the computer from the obtained coordinates (x,y) (step 111). When the coordinates B of the mouse cursor 13 on the three-dimensional geometric model has been obtained, the node candidate searching portion obtains the node, that is nearest the obtained position B of the mouse cursor 13, from among nodes projected on the plane running parallel to the screen plane in the model space (steps 112 to 119).

When the nearest node has been obtained, the geometric form characteristic reading means 37 reads the geometric form characteristics corresponding to the obtained node from the geometric form characteristic data file 36 to output it to the geometric form characteristic display means 38 (step 120). The geometric form characteristic display means 38 confirms whether or not the geometric form characteristic has been displayed on the principal curvature graph (step 121). If the geometric form characteristic has been displayed, it is deleted, followed by displaying the sign, that indicates the input geometric form characteristic, on a corresponding position in the principal curvature graph (steps 122 and 123).

If the confirmation of the form is continued, the position must be instructed by using the mouse cursor. By inputting "QUIT" using the keyboard or by changing the operation mode, escape from the processing loop is performed so that the process is completed.

Figure 8:
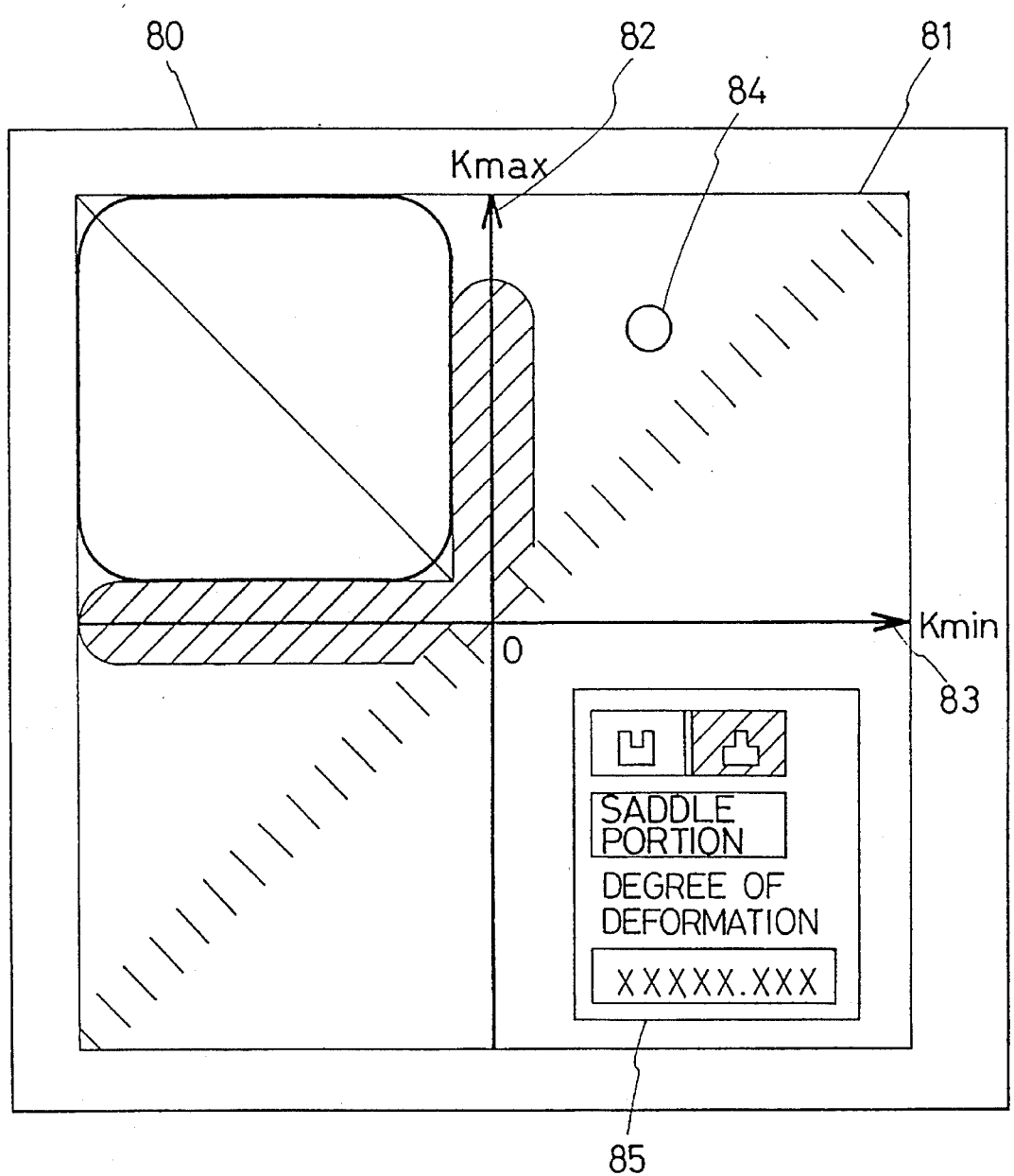
FIG. 8 illustrates another example of a display screen where the geometric form characteristic is displayed in the form of a principal curvature graph.

FIG. 8 illustrates an example of display of the geometric form characteristic display region made on the screen when the geometric form characteristic is expressed by the principal curvature graph. In this example, a region, in which a dot 84 plotted is present, is expressed by highlight or blinking a characteristic "concave" or "convex" in a characteristic information display region 85 in a geometric form characteristic display region 80. In the case of the saddle portion, characteristics "umbilicus" are highlighted or blinked. The distance from the dot (the dot indicating the geometric form characteristic of an indicated point of the form that is displayed on the screen now) 84 plotted now to the origin 0 expressed as follows is defined as the degree of deformation of the indicated point from the surface of the form:

$$D = \sqrt{\{(k_{max})^2 + (k_{min})^2\}}$$

The distance is calculated as the geometric form characteristic, followed by numerically displaying it in the characteristic information display region 85. Also the degree of deformation can be previously calculated for each node to be stored in the geometric form characteristic data file 36. As a result of the foregoing display method, the form characteristic to which the plotted dot belongs, that is, the form characteristic of the portion pointed with the mouse cursor can be confirmed with the character and a numeral.

Although the graphs shown in FIGS. 4 to 6 and the graph shown in FIG. 7 or 8 are individually provided in the foregoing embodiments, at least any one of the graphs shown in FIGS. 4 to 6 and the graph shown in FIG. 7 or FIG. 8 may be displayed together.

The number of the dot plotted on the graph is not limited to one, and, therefore, a plurality of dots may be displayed. In this case, change in the geometric form characteristic occurring due to a modification of the geometric data can be recognized for example. Therefore, a discrimination can easily be made to obtain a result desired by the user.

According to the present invention, the form characteristic of a geometric model constituted in a computer can be displayed in real time on a display device such as a CRT. Therefore, the form can be modified by means of a dialogue with the computer while confirming the form characteristic. In particular, in the case where the principal curvature deduced from the function formula of the internal expression is made to be the altitude of form characteristic of a free form surface, concave. convex and plane portions can be satisfactorily expressed on the screen as imagined by the user as compared with the conventional expression made while basing on a Gaussian curvature or a mean curvature. As a result, the machining work by using a model making machine or a three-dimensional resin model processing system can be significantly simplified and, accordingly, the efficiency of designing a form can be improved.

Although the invention has been described in its preferred form with a certain degree of particularly, it is understood that the present disclosure of the preferred form has been changed in the details of construe tion and the combination and arrangement of parts may be resorted to without departing from the spirit and the scope of the invention as hereinafter claimed.

What is claimed is:

1. A method of expressing a geometric form characteristic in a computer, said method comprising the steps of:

inputting geometric data of a geometric model;

displaying said geometric model on a display screen;

indicating of said displayed form by using a pointing device;

converting coordinates indicated on said display screen into coordinates of a point on said geometric model;

calculating geometric analysis data of said arbitrarily indicated point using said converted coordinates, said geometric analysis data including altitude, normal and curvature of said arbitrarily indicated point on said geometric model;

converting the calculated geometric analysis data into data for display as graph; and displaying said calculated altitude of form characteristic on said display screen as a graph expressing quantities.

2. A method of expressing an altitude of form characteristic according to claim 1, wherein said graph includes any one of a bar graph for showing one-dimensional data, a circle graph for showing cyclic one-dimensional data, a three-dimensional arrow graph for showing a direction in three or lower dimensional space, a two-dimensional graph having two axes which respectively are the maximum value and the minimum value of the principal curvature of a curved surface at said instructed point, a graph showing a two-dimensional region having two axes which respectively are the maximum value and the minimum value of the principal curvature of said curved surface at an instructed point, as a background thereof sectioned in accordance with the form characteristic such as the concave, convex and plane portions, and a graph showing a two-dimensional region having two axes which respectively are the maximum value and the minimum value of the principal curvature of said curved surface at said instructed point, as a background thereof sectioned in accordance with the form characteristic such as the concave, convex and plane portions and as well as showing characterstat information indicating said form characteristic at said instructed point.

3. A method of expressing an altitude of form characteristic according to claim 1, wherein said graph is formed by synthesizing at least one of a bar graph, a circle graph and a three-dimensional arrow graph, and a graph showing a two-dimensional region having two axes which respectively are the maximum value and the minimum value of the principal curvature of said curved surface at an instructed point, as a background thereof sectioned in accordance with the form characteristic such as the concave, convex and plane portions, or a graph showing a two-dimensional region having two axes which respectively are the maximum value and the minimum value of the principal curvature of said curved surface at said instructed point, as a background thereof sectioned in accordance with the form characteristic such as the concave, convex and plane portions and as well as showing character information indicating said form characteristic at said instructed point.

4. A method of expressing a geometric form characteristic in a computer, said method comprising the steps of:

inputting geometric data of a geometric model;

displaying said geometric model on a display screen;

indicating an arbitrary point of said displayed form;

converting coordinates indicated on said display screen into coordinates of a point on said geometric model;

calculating geometric analysis data of said arbitrarily indicated point using said converted coordinates, said geometric analysis data including altitude, normal and curvature of said arbitrarily indicated point on said geometric model;

converting the calculated geometric analysis data into data for display as a graph;

processing said converted geometric analysis data for display as a graph on said display screen at a high rate of speed; and changing plotting positions on said graph corresponding to movement of said pointing device on said display screen.

5. A method of expressing an altitude of form characteristic according to claim 4, wherein said graph is any one of bar graph for showing one-dimensional data, a circle graph for showing a cyclic one-dimensional data, a three-dimensional arrow graph for showing a direction in three or lower dimensional space, a two-dimensional graph having an ordinate axis and an abscissa axis which respectively are either of the maximum value and the minimum value of the principal curvature of a curved surface at said indicated point, a graph showing a two-dimensional region having two axes which respectively are the maximum value and the minimum value of the principal curvature of said curved surface at an indicated point, as a background thereof sectioned in accordance with the form characteristic such as the concave, convex and plane portions, and a graph showing a two-dimensional region having two axes which respectively are the maximum value and the minimum value of the principal curvature of said curved surface at said indicated point, as a background thereof sectioned in accordance with the form characteristic such as the concave, convex and plane portions and as well as showing characteristic information indicating said form characteristic at said indicated point. -

6. A method of expressing an altitude of form characteristic according to claim 4, wherein said graph is formed by synthesizing at least any one of a bar graph, a circle graph and a three-dimensional arrow graph, and a graph showing a two-dimensional region having two axes which respectively are the maximum value and the minimum value of the principal curvature of said curved surface at an instructed point, as a background thereof sectioned in accordance with the form characteristic such as the concave, convex and plane portions, or a graph showing a two-dimensional region having two axes of which respectively are the maximum value and the minimum value of the principal curvature of said curved surface at said indicated point, as a background thereof sectioned in accordance with the form characteristic such as the concave, convex and plane portions and as well as showing characteristic information indicating said form characteristic at said instructed point.

7. A method of expressing a geometric form characteristic in a computer, said method comprising the steps of:

inputting geometric data of a geometric model;

displaying said geometric model on a display screen;

generating nodes on a surface of said geometric model to store said nodes as node data;

previously calculating a geometric form characteristic at each of said nodes in accordance with said geometric data to store said geometric form characteristic as data of said geometric form characteristic;

indicating an arbitrary point of said displayed form;

calculating a distance from each node to a point that can be obtained by converting coordinates of said indicated point into coordinates in a display space to obtain a node nearest said indicated point;

reading the geometric form characteristic corresponding to said obtained node from said data of said geometric form characteristic which has been previously stored; and displaying said read geometric form characteristic on said display screen as a graph.

8. A method of expressing a geometric form characteristic according to claim 7, wherein said graph is any one of a bar graph for showing one-dimensional data, a circle graph for showing cyclic one-dimensional data, a three-dimensional arrow graph for showing a direction in three or lower dimensional space, a two-dimensional graph having an ordinate axis and an abscissa axis which respectively are either of the maximum value and the minimum value of the principal curvature of a curved surface at said indicated point, a graph showing a two-dimensional region having two axes which respectively are the maximum value and the minimum value of the principal curvature of said curved surface at an indicated point, as a background thereof sectioned in accordance with the form characteristic such as the concave, convex and plane portions, and a graph showing a two-dimensional region having two axes which respectively are the maximum value and the minimum value of the principal curvature of said curved surface at said indicated point, as a background thereof sectioned in accordance with the form characteristic such as the concave, convex and plane portions and as well as showing characteristic information indicating said form characteristic at said indicated point.

9. A method of expressing an altitude of form characteristic according to claim 7, wherein said graph is formed by synthesizing at least any one of a bar graph, a circle graph and a three-dimensional arrow graph, and a graph showing a two-dimensional region having two axes which respectively are the maximum value and the minimum value of the principal curvature of said curved surface at an indicated point, as a background thereof sectioned in accordance with the form characteristic such as the concave, convex and plane portions, or a graph showing a two-dimensional region having two axes which respectively are the maximum value and the minimum value of the principal curvature of said curved surface at said instructed point, as a background thereof sectioned in accordance with the form characteristic such as the concave, convex and plane portions and as well as showing characteristic information indicating said form characteristic at said indicated point.

10. A method of expressing a geometric form characteristic in a computer, said method comprising the steps of:

inputting geometric data of a geometric model;

displaying said geometric model on a display screen;

generating nodes on a surface of said geometric model to store said nodes as node data;

previously calculating a geometric form characteristic at each of said nodes in accordance with said geometric data to store said geometric form characteristic as data of said geometric form characteristic;

indicating an arbitrary point of said displayed form;

calculating the distance from each node to a point that can be obtained by converting coordinates of said indicated point into coordinates in a display space to obtain a node nearest said indicated point;

reading the geometric form characteristic corresponding to said obtained node from said data of said geometric form characteristic which has been previously stored; and sequentially plotting and displaying in a timesequential manner a plurality of said read geometric form characteristics on a graph on said display screen.

11. A method of expressing a geometric form characteristic according to claim 4, wherein said graph is any one of a bar graph for showing one-dimensional data, a circle graph for showing cyclic one-dimensional data, a three-dimensional arrow graph for showing a direction in three or lower dimensional space, a two-dimensional graph having an ordinate axis and an abscissa axis which respectively are either of the maximum value and the minimum value of the principal curvature of a curved surface at said indicated point, a graph showing a two-dimensional region having two axes of which respectively are the maximum value and the minimum value of the principal curvature of said curved surface at an indicated point, as a background thereof sectioned in accordance with the form characteristic such as the concave, convex and plane portions, and a graph showing a two-dimensional region having two axes which respectively are the maximum value and the minimum value of the principal curvature of said curved surface at said indicated point, as a background thereof sectioned in accordance with the form characteristic such as the concave, convex and plane portions and as well as showing characteristic information indicating said form characteristic at said indicated point.

12. A method of expressing a geometric form characteristic according to claim 4, wherein said graph is formed by synthesizing at least any one of a bar graph, a circle graph and a three-dimensional arrow graph, and a graph showing a two-dimensional region having two axes which respectively are the maximum value and the minimum value of the principal curvature of said curved surface at an indicated point, as a background thereof sectioned in accordance with the form characteristic such as the concave, convex and plane portions, or a graph showing a two-dimensional region having two axes which respectively are the maximum value and the minimum value of the principal curvature of said curved surface at an indicated point, as a background thereof sectioned in accordance with the form characteristic such as the concave, convex and plane portions and as well as showing characteristic information indicating said form characteristic at said indicated point.

13. A method of expressing a geometric form characteristic in a computer, said method comprising the steps of:

inputting geometric data of a geometric model;

generating nodes on a surface of said geometric model to store said nodes as node data;

previously calculating the maximum value and the minimum value of the principal curvature of a curved surface at each of said nodes for storing as data of the geometric form characteristic;

displaying said geometric model on a display screen;

displaying, in a portion of said display screen, a principal curvature graph showing a two-dimensional region having two axes which respectively are the maximum value and the minimum value of the principal curvature of said curved surface at an indicated point, as a background thereof sectioned in accordance with the form characteristic such as the concave, convex and plane portions;

indicating an arbitrary point of said displayed form;

calculating a distance from a point obtained by converting coordinates of said indicated point into coordinates in a display space to each of said nodes to obtain a node nearest said indicated point;

reading the maximum value and the minimum value of the principal curvature of a curved surface corresponding to said obtained node from said data of said geometric form characteristic which has been previously stored; and sequentially plotting and displaying in a timesequential manner said read data on said principal curvature graph on said display screen.

14. A method of expressing a geometric form characteristic according to claim 13, wherein said calculated maximum value $\underline{k}_{max}$ and minimum value $\underline{k}_{min}$ of said principal curvature of said curved surface at each node are used to calculate $D=\sqrt{\{(\underline{k}_{max})^2+(\underline{k}_{min})^2\}}$ as degree of deformation of an indicated point of said form from the plane, said degree of deformation D is stored together with the maximum value $\underline{k}_{max}$ and the minimum value $\underline{k}_{min}$ of said principal curvature of said curved surface at each node, the maximum value and the minimum value of the principal curvature of a curved surface corresponding to said obtained node and stored previously are read from said data of said geometric form characteristic, said degree of deformation D is, as characteristic data, displayed on said principal curvature graph when plotting said read data on said principal curvature graph on said display screen, and a concave, convex, saddle portion or plane to which the form of said indicated point belongs is, as said characteristic data, displayed on said principal curvature graph.

15. An apparatus for displaying an altitude of form characteristic in a computer comprising:

means for storing geometric data of an input geometric model;

form display means for displaying said geometric model on a display screen;

a pointing device for indicating an arbitrary point of said displayed form;

position instruction means for converting coordinates indicated on said display screen into coordinates of said point on said input geometric model;

geometric form characteristic calculating means for calculating the geometric form characteristic at said indicated point on said geometric model; and altitude of form characteristic display means for displaying said calculated altitude of form characteristic on said display screen as a graph.

16. An apparatus for displaying an altitude of form characteristic in a computer comprising:

means for storing geometric data of an input geometric model;

form display means for displaying said geometric model on a display screen;

a pointing device for indicating an arbitrary point of said displayed form;

position indicating means for converting coordinates indicated on said display screen into coordinates of said point on said input geometric model;

geometric form characteristic calculating means for calculating the geometric form characteristic at said indicated point on said geometric model; and geometric form characteristic display means for sequentially plotting and displaying in a time-sequential manner a plurality of said calculated geometric form characteristics on a graph on said display screen.

17. An apparatus for displaying an altitude of form characteristic in a computer comprising:

means for storing geometric data of an input geometric model;

form display means for displaying said geometric model on a display screen;

node calculating means for generating nodes on a surface of said geometric model to store said nodes as node data;

geometric form characteristic calculating means for previously calculating a geometric form characteristic at each of said nodes in accordance with said geometric data to store said geometric form characteristic;

a pointing device for indicating an arbitrary point of said displayed form;

position indicating means for calculating a distance from each node to a point that can be obtained by converting coordinates of said indicated point into coordinates in a display space to obtain a node nearest said indicated point;

geometric form characteristic reading means for reading the geometric form characteristic corresponding to said obtained node from said data of geometric form characteristic which has been previously stored; and geometric form characteristic display means for display said read geometric form characteristic on a display screen as a graph.

18. An apparatus for displaying an altitude of form characteristic in a computer, comprising:

means for storing geometric data of an input geometric model;

form display means for displaying said geometric model on a display screen;

node calculating means for generating nodes on a surface of said geometric model to store said nodes as node data;

geometric form characteristic calculating means for previously calculating a geometric form characteristic at each of said nodes in accordance with said geometric data to store said geometric form characteristic as data of said geometric form characteristic;

a pointing device for indicating an arbitrary point of said displayed form;

position indicating means for calculating a distance from each node to a point that can be obtained by converting coordinates of said indicated point into coordinates in a display space to obtain a node nearest said indicated point;

geometric form characteristic reading means for reading the geometric form characteristic corresponding to said obtained node from said data of geometric form characteristic which has been previously stored; and geometric form characteristic display means for sequentially plotting and displaying in a time-sequential manner a plurality of said read geometric form characteristic on a graph on said display screen.

19. An apparatus for displaying an altitude of form characteristic in a computer comprising:

a display device having a display screen for displaying a form characteristic;

a geometric data file for storing geometric data of an input geometric model;

form display means for reading said geometric data to display said geometric model on said display screen of said display device;

geometric form characteristic display region processing means for displaying a principal curvature graph showing a two-dimensional region having two axes which respectively are the maximum value and the minimum value of the principal curvature of said curved surface, as background thereof sectioned in accordance with the form characteristic such as the concave, convex and plane portions;

node calculating means for generating a plurality of nodes, as node data on a surface of said geometric model to calculate the correspondence between the positions of said nodes on said geometric model and the coordinates on said display screen;

node data file for storing said calculated node data;

geometric form characteristic calculating means for calculating, as geometric form characteristic, maximum value $k_{max}$, minimum value $k_{min}$ and degree of deformation $D=\sqrt{\{(k_{max})^2+(k_{min})\}}$ of the principal curvature at each of said nodes in accordance with said geometric data and said node data;

geometric form characteristic data file for storing said calculated geometric form characteristic together with said node;

a pointing device for instructing, on said screen, an arbitrary point of said form displayed on said screen;

a screen coordinate calculating portion for calculating the coordinates of said point on said screen instructed by said pointing device;

a space coordinate calculating portion for converting said calculated coordinates on said screen into the coordinates in a display space;

a node candidate searching portion for calculating the distance from each of said nodes to a point indicated with said coordinates in said display space obtained by said conversion to obtain a node nearest said indicated point;

geometric form characteristic reading means for reading the geometric form characteristic corresponding to the obtained nearest node from said geometric form characteristic data file to output said geometric form characteristic;

geometric form characteristic display means for plotting maximum value $k_{max}$ and minimum value $k_{min}$ of the principal curvature among said geometric form characteristic output from said geometric form characteristic reading means on a principal curvature graph on said display screen to display said degree of deformation D as character data in said principal curvature graph; and a keyboard for inputting control signals to said form display means and said geometric form characteristic display region processing means.

* * * * *